(12) United States Patent
Ellis-Monaghan et al.

(10) Patent No.: US 9,002,156 B2
(45) Date of Patent: Apr. 7, 2015

(54) VERTICALLY CURVED WAVEGUIDE

(71) Applicant: International Business Machines Corporation, Armonk, NY (US)

(72) Inventors: John J. Ellis-Monaghan, Grand Isle, VT (US); Jeffrey P. Gambino, Westford, VT (US); Mark D. Jaffe, Shelburne, VT (US); Kirk D. Peterson, Jericho, VT (US); Jed H. Rankin, Richmond, VT (US)

(73) Assignee: International Business Machines Corporation, Armonk, NY (US)

(*) Notice: Subject to any disclaimer, the term of this patent is extended or adjusted under 35 U.S.C. 154(b) by 10 days.

(21) Appl. No.: 13/872,396

(22) Filed: Apr. 29, 2013

(65) Prior Publication Data
US 2014/0321802 A1 Oct. 30, 2014

(51) Int. Cl.
G02B 6/12 (2006.01)
G02B 6/26 (2006.01)
G02B 6/122 (2006.01)
G02B 6/13 (2006.01)

(52) U.S. Cl.
CPC . *G02B 6/122* (2013.01); *G02B 6/13* (2013.01)

(58) Field of Classification Search
CPC .................................................. G02B 6/125
See application file for complete search history.

(56) References Cited

U.S. PATENT DOCUMENTS

| 5,841,931 | A  | * | 11/1998 | Foresi et al. .............. 385/131 |
|---|---|---|---|---|
| 7,068,870 | B2 |   | 6/2006 | Steinberg et al. |
| 7,310,468 | B2 |   | 12/2007 | Kittaka et al. |
| 7,496,254 | B2 |   | 2/2009 | Miyadera et al. |
| 7,646,943 | B1 | * | 1/2010 | Wober ........................ 385/12 |
| 8,238,704 | B2 |   | 8/2012 | Bakir et al. |
| 2004/0184704 | A1 | * | 9/2004 | Bakir et al. .................. 385/14 |
| 2004/0252931 | A1 | * | 12/2004 | Belleville et al. ............. 385/14 |
| 2011/0170825 | A1 |   | 7/2011 | Spector et al. |
| 2012/0141069 | A1 |   | 6/2012 | Ming-Chang et al. |
| 2012/0156369 | A1 |   | 6/2012 | Kim et al. |
| 2012/0243827 | A1 |   | 9/2012 | Jeong |

OTHER PUBLICATIONS

Pending U.S. Appl. No. 13/872,385, filed Apr. 29, 2013, entitled: "Vertical Bend Waveguide Coupler for Photonics Applications".

* cited by examiner

*Primary Examiner* — Omar R Rojas
(74) *Attorney, Agent, or Firm* — David Cain; Keivan Razavi

(57) ABSTRACT

An optical waveguide structure may include an optical waveguide structure located within a semiconductor structure and an optical coupler. The optical coupler may include a metallic structure located within an electrical interconnection region of the semiconductor structure, whereby the metallic structure extends downward in a substantially curved shape from a top surface of the electrical interconnection region and couples to the optical waveguide structure. The optical coupler may further include an optical signal guiding region bounded within the metallic structure, whereby the optical coupler receives an optical signal from the top surface and couples the optical signal to the optical waveguide structure such that the optical signal propagation is substantially vertical at the top surface and substantially horizontal at the optical waveguide structure.

11 Claims, 13 Drawing Sheets

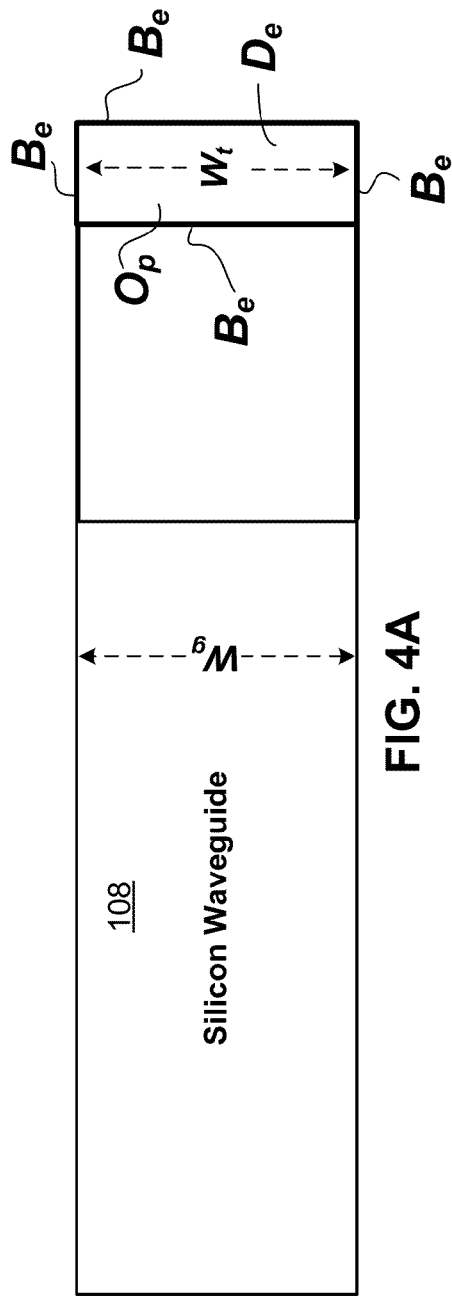
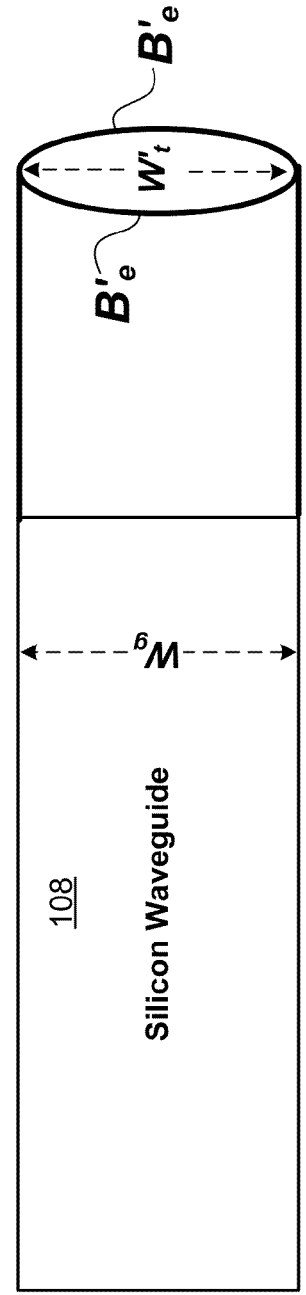
FIG. 4A
FIG. 4B

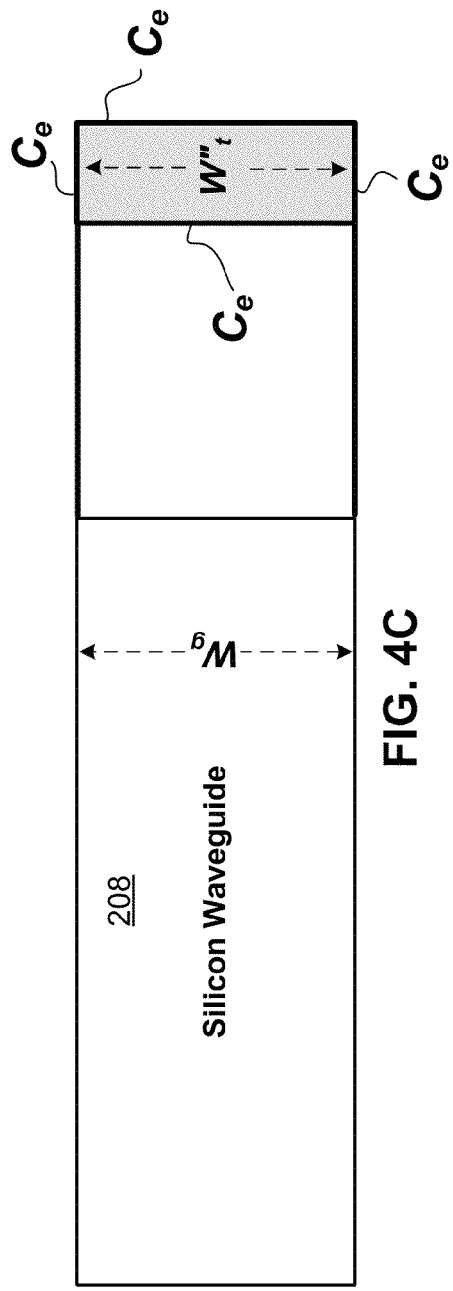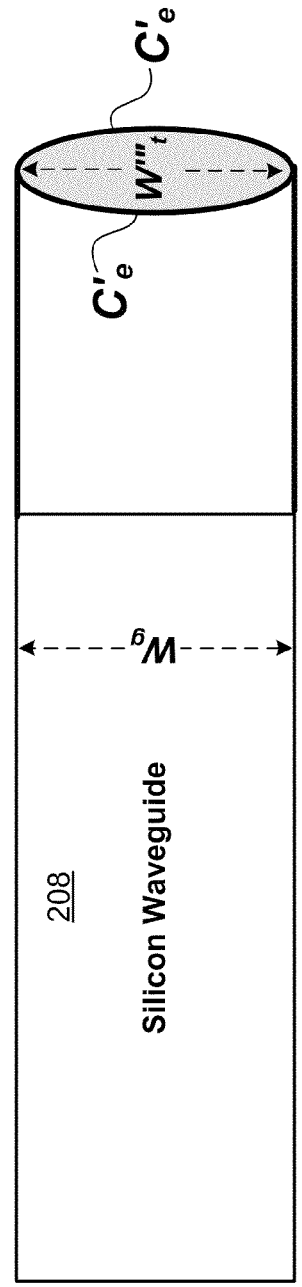
FIG. 4C
FIG. 4D

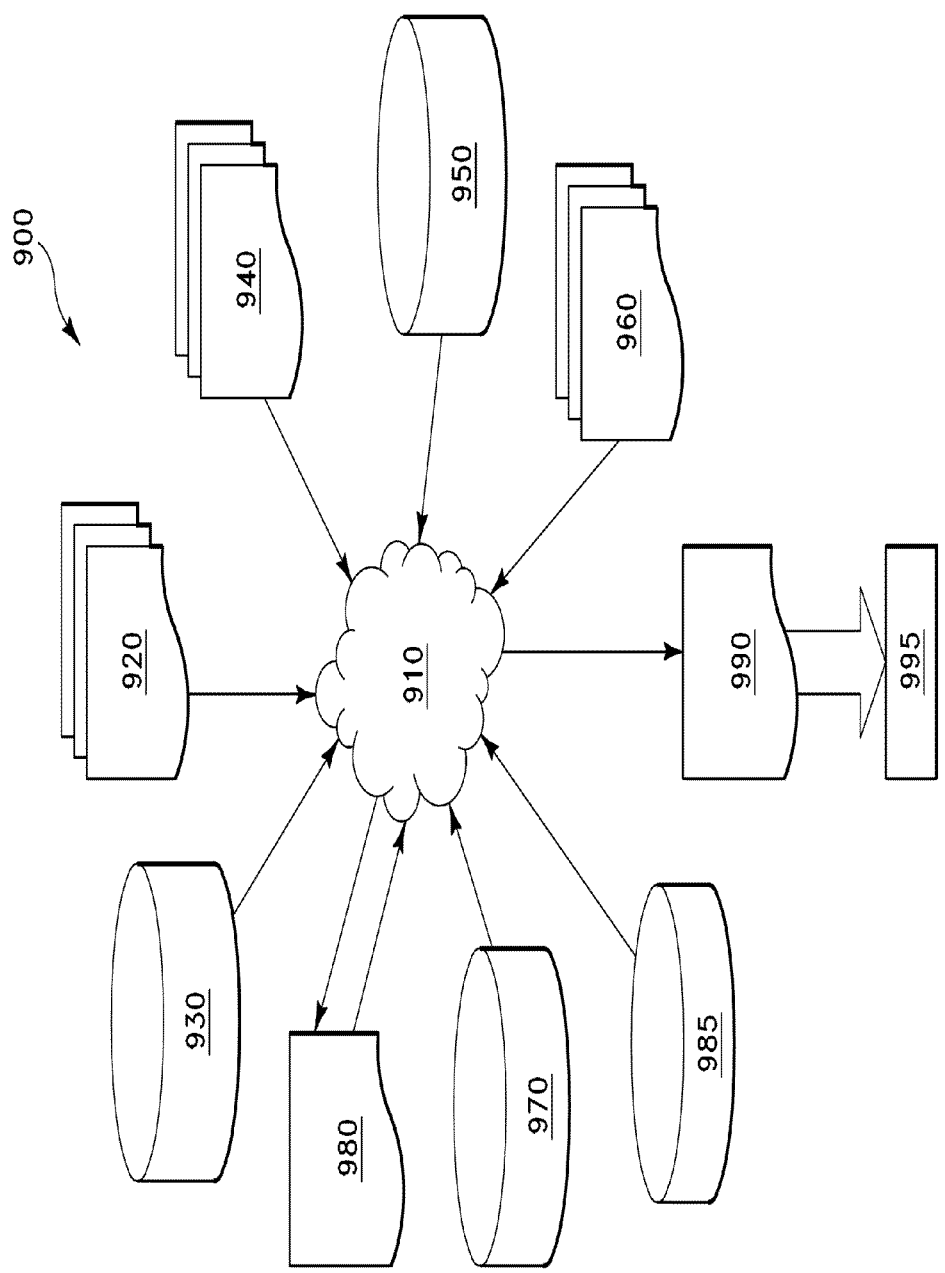

VERTICALLY CURVED WAVEGUIDE

BACKGROUND a. Field of the Invention

The present invention generally relates to integrated photonic devices, and more particularly to optical coupler devices utilized for coupling optical signals to/from integrated photonics devices.

b. Background of Invention

The use of both photonic devices in high-speed switching and transceiver devices in data communications are but a few examples that highlight the advantages of processing both optical and electrical signals within a single integrated device. For example, an integrated photonic device may include both photonic and CMOS type devices that may be fabricated with a single substrate. However, optical signals may need to be efficiently transmitted to and from the integrated photonic device without enduring significant power loss. Moreover, within the integrated photonic device, optical signals may need to be efficiently coupled to a photonic device (e.g., a photodetector) via an optical waveguide residing within the integrated photonic device. Thus, when packaging an integrated photonic device, optical signals may be coupled onto and off from the chip. Typically, fiber waveguides can be attached through the package to the semiconductor device or chip.

It may, therefore, be advantageous, among other things, to more efficiently couple optical signals to optical waveguide structures residing within integrated photonic devices.

BRIEF SUMMARY

According to at least one exemplary embodiment, a waveguide structure may include an optical waveguide structure located within a semiconductor structure and an optical coupler. The optical coupler may include a metallic structure located within an electrical interconnection region of the semiconductor structure, whereby the metallic structure extends downward in a substantially curved shape from a top surface of the electrical interconnection region and couples to the optical waveguide structure. The optical coupler further includes an optical signal guiding region bounded within the metallic structure, whereby the optical coupler receives an optical signal from the top surface and couples the optical signal to the optical waveguide structure such that the optical signal propagation is substantially vertical at the top surface and substantially horizontal at the optical waveguide structure.

According to at least one other exemplary embodiment, a method of forming a waveguide structure within a semiconductor structure may include forming an optical waveguide structure and forming a first metal structure that bounds a first dielectric region, whereby the first metal structure is coupled to a top surface of the optical waveguide structure. A second metal structure that bounds a second dielectric region is also formed, whereby the second metal structure is coupled to a portion of a top surface of the first metal structure. The first and the second dielectric region are then etched to form an opening, where a fill material is deposited within the opening to form a bounded fill region. The first and the second metal structure and the fill material have a refractive index difference that substantially confines propagating optical signals within the bounded fill region along a substantially curved optical path for coupling to the optical waveguide structure.

According to yet another exemplary embodiment, a method of forming a waveguide structure within a semiconductor structure may include forming an electrical interconnection region having a top surface and a bottom portion, and forming an optical waveguide structure adjacent the bottom portion. A first metal structure is formed within a first interlayer dielectric layer corresponding to the electrical interconnection region, whereby the first metal structure is coupled to a top surface of the optical waveguide structure. A second metal structure is also formed within a second interlayer dielectric layer corresponding to the electrical interconnection region, whereby the second metal structure is coupled to a portion of a top surface of the first metal structure. The first and the second metal structure are then etched to form an opening within the first and the second interlayer dielectric layer, followed by depositing a fill material within the opening to form a fill region. The first and the second interlayer dielectric layer and the fill material have a refractive index difference that substantially confines propagating optical signals within the fill region along a substantially curved optical path.

BRIEF DESCRIPTION OF THE SEVERAL VIEWS OF THE DRAWINGS

FIG. 4A-4D is a plan view of exemplary cross sectional profiles for the vertical bend optical waveguide coupler embodiments depicted in FIGS. 1-3; and FIG. 5 is a flow diagram of a design process used in semiconductor design, manufacture, and/or test according to an exemplary embodiment.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

The following one or more exemplary embodiments describe a vertical bend optical waveguide coupler that is embedded within an electrical interconnection region such as a back-end-of-the-line (BEOL) electrical interconnect region of, for example, an integrated photonics semiconductor device. The vertical bend optical waveguide coupler may receive the optical signals from an external waveguide such as an optical fiber, whereby the vertical bend optical waveguide coupler guides the received optical signals to one or more other waveguide structures that may also be embedded within the integrated photonics semiconductor device. An integrated photonics device may, for example, include both CMOS type electrical devices such as a field effect transistor (FET) and photonic type devices such as a photodetector device.

Figure 1A:
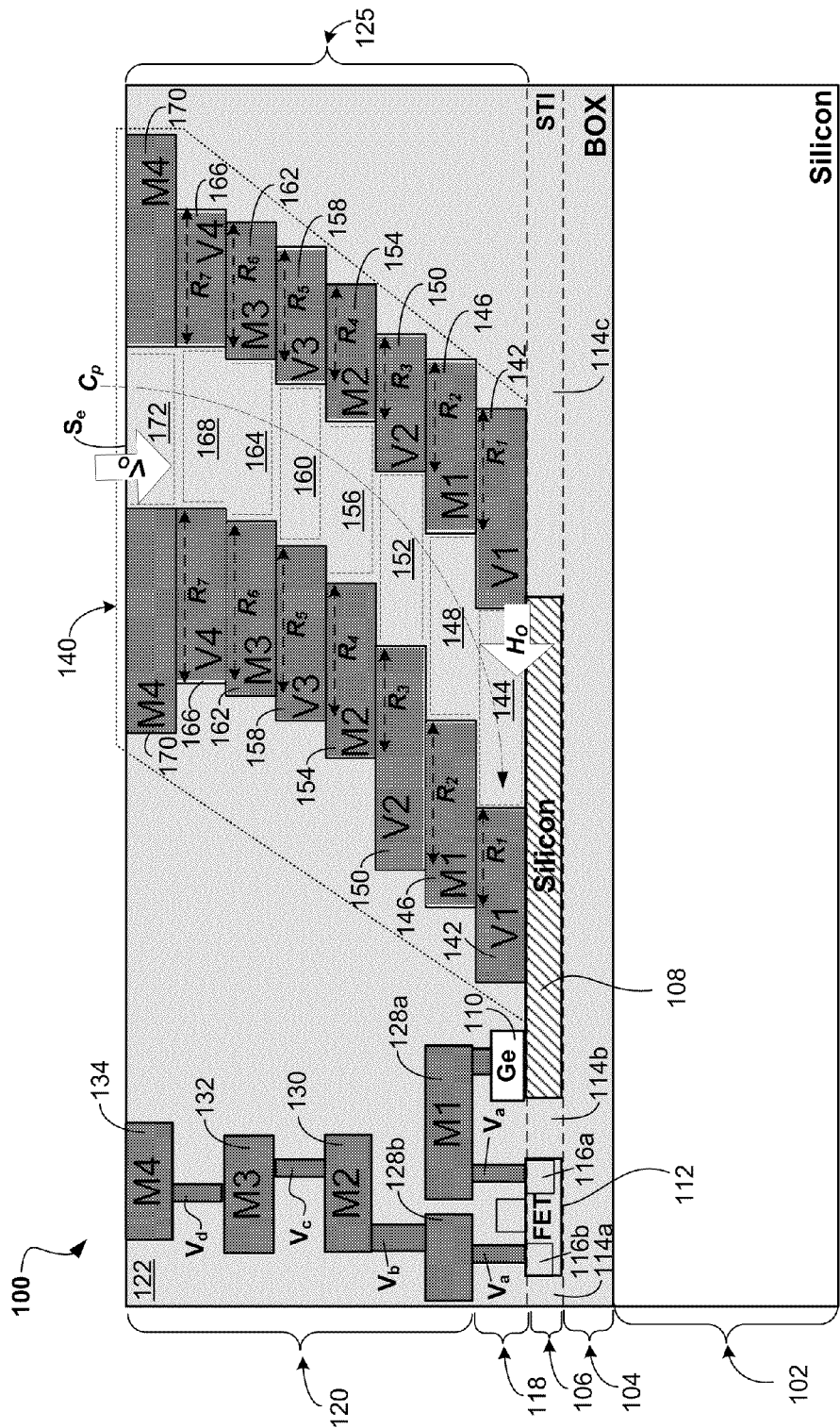
FIGS. 1A-1C are cross-sectional views corresponding to the fabrication of a vertical bend optical waveguide coupler within an integrated photonic semiconductor device structure according to an exemplary embodiment.
Figure 1B:
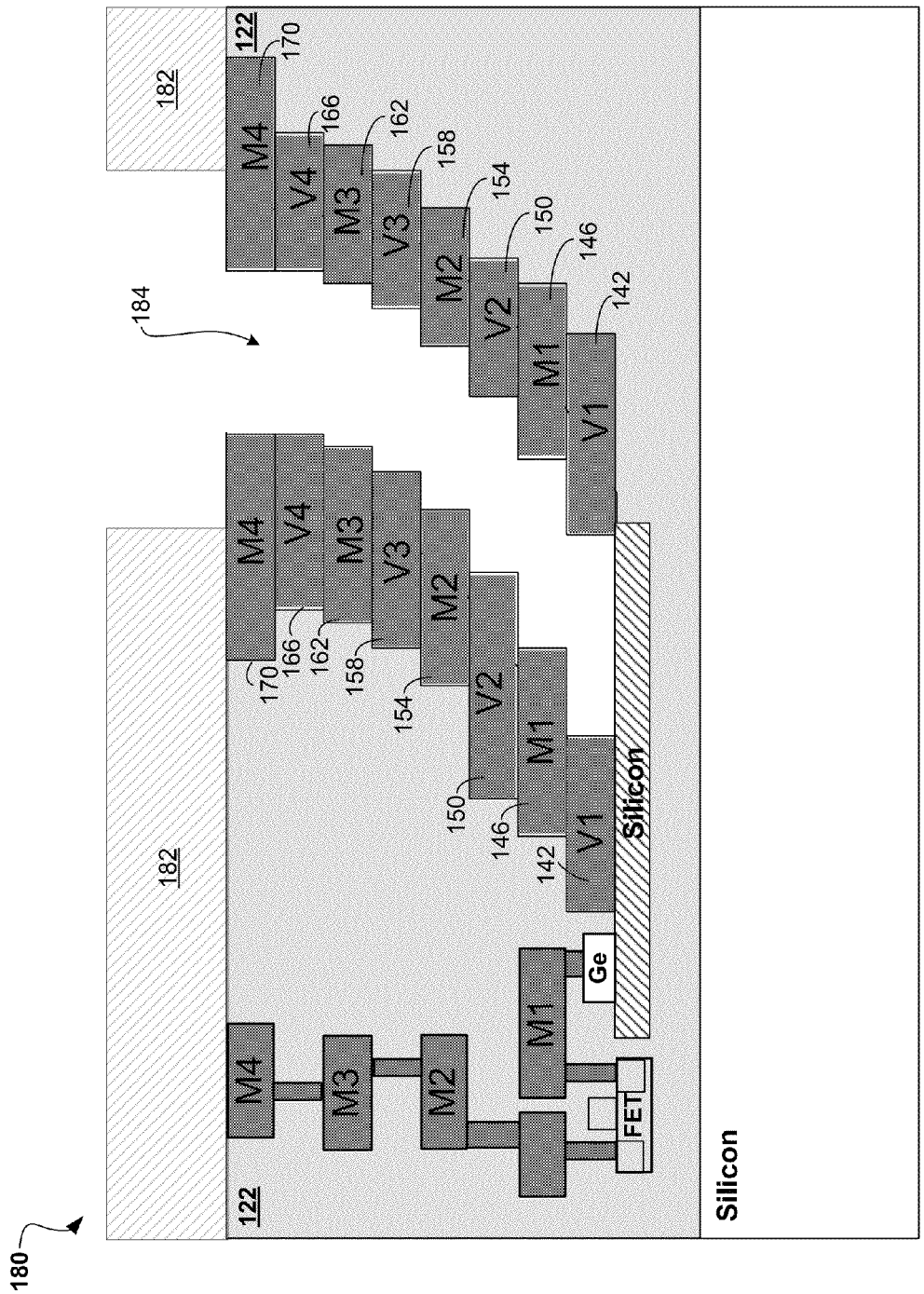
Figure 1C:
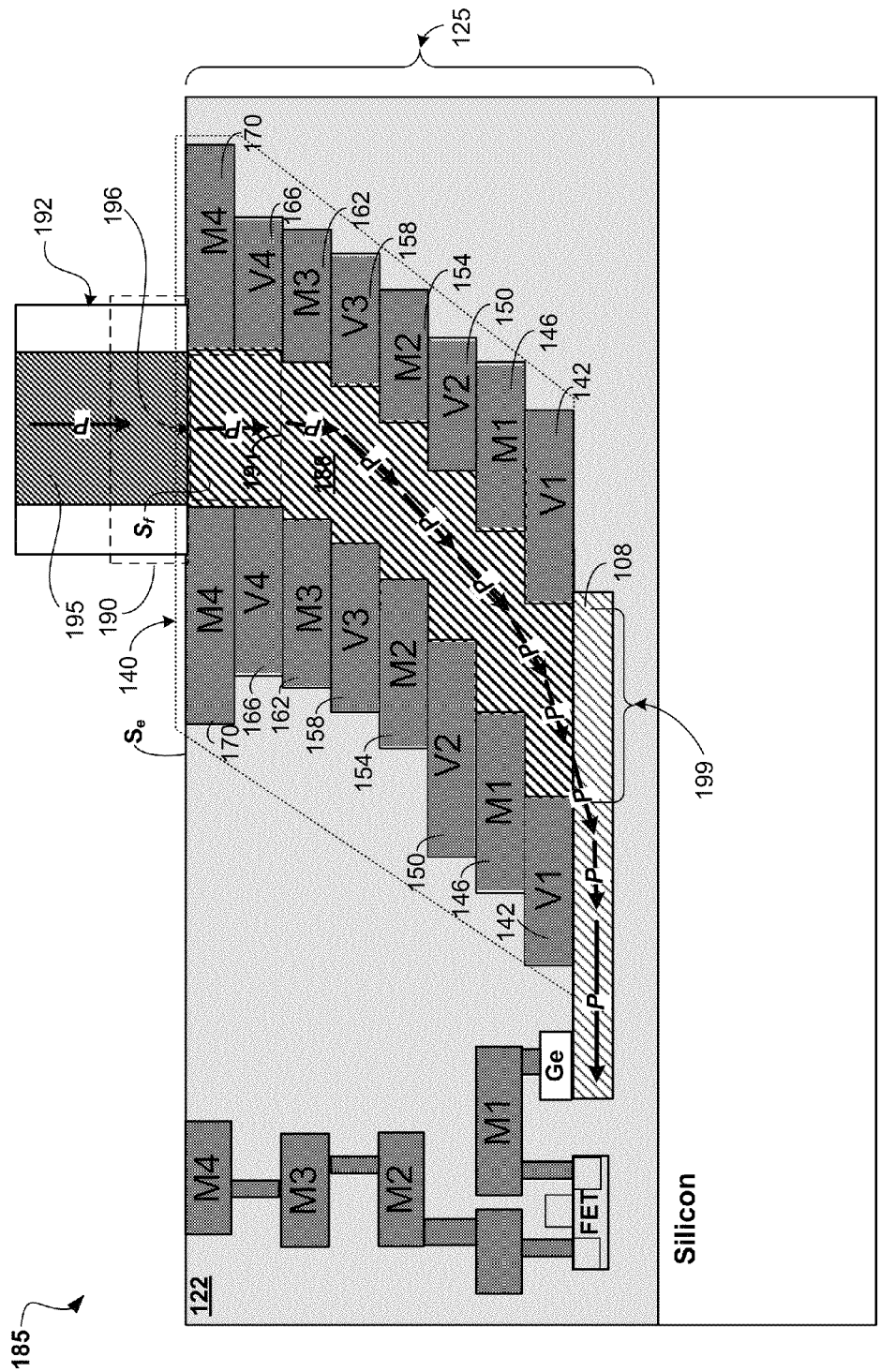

FIGS. 1A-1C are cross-sectional views corresponding to the fabrication of a vertical bend optical waveguide coupler within an integrated photonic semiconductor device structure according to one exemplary embodiment. Referring to FIG.

1A, a cross-sectional view of an exemplary embodiment of an integrated semiconductor photonics device 100 is depicted. Integrated photonics device 100 may include silicon substrate 102, buried oxide (BOX) layer 104, and silicon-on-insulator (SOI) region 106. The SOI region 106 may include a silicon or polysilicon waveguide 108, a germanium (Ge) photodetector 110, and a FET device 112, which is electrically isolated from the waveguide 108 and Ge photodetector 110 by shallow trench isolation region 114b. Shallow trench isolation regions 114a-114c may, for example, be filled with a silicon dioxide ($SiO_2$) insulation material.

As illustrated in FIG. 1A, the silicon waveguide 108 is coupled to the Ge photodetector 110, whereby optical signals guided by the silicon waveguide 108 are directed onto the active region (not shown) of the photodetector 110 for optoelectric conversion. The Ge photodetector 110 may be electrically coupled by a M1 metallization layer to source/drain (S/D) region 116a of the FET device 112. Also, the M1 metallization layer may electrically couple the other source/drain (S/D) region 116b of the FET device 112 to the other metallization layers, as denoted by M2-M4.

Referring to FIG. 1A, a borophosphosilicate (BPSG) insulating material may fill region 118, which is located above SOI region 106. Further, a silicon dioxide ($SiO_2$) insulation material may fill region 120, which is located above region 118. Regions 118 and 120 may include interlayer dielectric layers 122, which accordingly provide electrical insulation between the metallization layers (i.e., M1-M4). Regions 118 and 120 of device 100 may collectively form an electrical interconnection region 125 such as a BEOL region. As depicted, the electrical interconnection region 125 may provide electrical connectivity between various devices associated with integrated photonics device 100. For example, the electrical interconnection region 125 may provide electrical connectivity between the germanium (Ge) photodetector 110 and the FET device 112 using M1 contact 128a. Also, M1 contact 128b, M2 contact 130, M3 contact 132, and M4 contact 134 facilitate further electrical connectivity of the FET device 112 with any chip packaging (not shown) associated with the integrated photonics device 100. As illustrated, contacts 128-134 of the metallization layers are interconnected using via connections $V_a$-$V_d$.

The exemplary embodiment of FIG. 1A may utilize the process of establishing electrical interconnectivity between fabricated semiconductor devices (e.g., FET: 112, Ge Photodetector: 110) to concurrently create an embedded optical coupler. The optical coupler accordingly guides optical signals that may be received from the top surface $S_e$ of the electrical interconnection region 125 to an embedded optical waveguide structure such as silicon waveguide 108. Particularly, the metallization layers (i.e., M1-M4) and corresponding via layers (i.e., V1-V4) that are used to establish interconnectivity within the electrical interconnection region 125 may enable the creation of optical coupler 140. The following describes the formation of the optical coupler 140 using example BEOL processes for establishing electrical interconnections within the integrated semiconductor photonics device 100.

For example, via layer V1 may be utilized to fabricate metal structure 142. Since Via layer V1 may be lithographically fabricated within one of the interlayer dielectric layers 122 of electrical interconnection region 125, dielectric region 144 is created within metal structure 142. Referring to the plan view depicted in FIG. 4A, metal structure 142 (FIG. 1A) includes an enclosed boundary $B_e$ around a dielectric region $D_e$. Specifically, as illustrated in FIG. 1A, boundary $B_e$ (FIG. 4A) is formed by metal structure 142, which bounds dielectric region 144 (i.e., FIG. 4A: dielectric region $D_e$). Metal structure 142 may be at least partially formed over a portion of the top surface of silicon waveguide structure 108.

Metal layer M1 may be utilized to fabricate metal structure 146. Since metal layer M1 may be fabricated within one of the interlayer dielectric layers 122 of the electrical interconnection region 125, dielectric region 148 is created within metal structure 146. Referring to the plan view of FIG. 4A, metal structure 146 (FIG. 1A) creates an enclosed boundary $B_e$ around a dielectric region $D_e$. Specifically, as illustrated in FIG. 1A, boundary $B_e$ (FIG. 4A) is formed by metal structure 146, which bounds dielectric region 148 (i.e., also see FIG. 4A: dielectric region $D_e$). As depicted, metal structure 146 is formed over a region $R_1$ of the top portion of underlying metal structure 142.

Via layer V2 may be utilized to fabricate metal structure 150. Since via layer V2 may be fabricated within one of the interlayer dielectric layers 122 of the electrical interconnection region 125, dielectric region 152 is created within metal structure 150. Referring to the plan view of FIG. 4A, metal structure 150 (FIG. 1A) creates an enclosed boundary $B_e$ around a dielectric region $D_e$. Specifically, as illustrated in FIG. 1A, boundary $B_e$ (FIG. 4A) is formed by metal structure 150, which bounds dielectric region 152 (i.e., also see FIG. 4A: dielectric region $D_e$). As depicted, metal structure 150 is formed over a region $R_2$ of the top portion of underlying metal structure 146.

Metal layer M2 may be utilized to fabricate metal structure 154. Since metal layer M2 may be fabricated within one of the interlayer dielectric layers 122 of the electrical interconnection region 125, dielectric region 156 is created within metal structure 154. Referring to the plan view of FIG. 4A, metal structure 154 (FIG. 1A) creates an enclosed boundary $B_e$ around a dielectric region $D_e$. Specifically, as illustrated in FIG. 1A, boundary $B_e$ (FIG. 4A) is formed by metal structure 154, which bounds dielectric region 156 (i.e., also see FIG. 4A: dielectric region $D_e$). As depicted, metal structure 154 is formed over a region $R_3$ of the top portion of underlying metal structure 150.

Via layer V3 may be utilized to fabricate metal structure 158. Since via layer V3 may be fabricated within one of the interlayer dielectric layers 122 of the electrical interconnection region 125, dielectric region 160 is created within metal structure 158. Referring to the plan view of FIG. 4A, metal structure 158 (FIG. 1A) creates an enclosed boundary $B_e$ around a dielectric region $D_e$. Specifically, as illustrated in FIG. 1A, boundary $B_e$ (FIG. 4A) is formed by metal structure 158, which bounds dielectric region 160 (i.e., also see FIG. 4A: dielectric region $D_e$). As depicted, metal structure 158 is formed over a region $R_4$ of the top portion of underlying metal structure 154.

Metal layer M3 may be utilized to fabricate metal structure 162. Since metal layer M3 may be fabricated within one of the interlayer dielectric layers 122 of the electrical interconnection region 125, dielectric region 164 is created within metal structure 162. Referring to the plan view of FIG. 4A, metal structure 162 (FIG. 1A) creates an enclosed boundary $B_e$ around a dielectric region $D_e$. Specifically, as illustrated in FIG. 1A, boundary $B_e$ (FIG. 4A) is formed by metal structure 162, which bounds dielectric region 164 (i.e., also see FIG. 4A: dielectric region $D_e$). As depicted, metal structure 162 is formed over a region $R_5$ of the top portion of underlying metal structure 158.

Via layer V4 may be utilized to fabricate metal structure 166. Since via layer V4 may be fabricated within one of the interlayer dielectric layers 122 of the electrical interconnection region 125, dielectric region 168 is created within metal structure 166. Referring to the plan view of FIG. 4A, metal structure 166 (FIG. 1A) creates an enclosed boundary $B_e$ around a dielectric region $D_e$. Specifically, as illustrated in FIG. 1A, boundary $B_e$ (FIG. 4A) is formed by metal structure 166, which bounds dielectric region 168 (i.e., also see FIG. 4A: dielectric region $D_e$). As depicted, metal structure 166 is formed over a region $R_6$ of the top portion of underlying metal structure 162.

Metal layer M4 may be utilized to fabricate metal structure 170. Since metal layer M4 may be fabricated within one of the interlayer dielectric layers 122 of the electrical interconnection region 125, dielectric region 172 is created within metal structure 170. Referring to the plan view of FIG. 4A, metal structure 170 (FIG. 1A) creates an enclosed boundary $B_e$ around a dielectric region $D_e$. Specifically, as illustrated in FIG. 1A, boundary $B_e$ (FIG. 4A) is formed by metal structure 170, which bounds dielectric region 172 (i.e., also see FIG. 4A: dielectric region $D_e$). As depicted, metal structure 170 is formed over a region $R_7$ of the top portion of underlying metal structure 166.

As depicted, the foregoing describes a stacked staircase-shaped metal structure that is formed from interleaved via and metallization layers. It may be appreciated that metal structures 142-170 can be formed from any processes used for BEOL electrical interconnectivity. Moreover, it may be contemplated that other conductive non-metallic materials (e.g., doped polysilicon) may be used for the metal structures. The stacked staircase-shaped metal structures 142-170 may form the outer-cladding of the optical coupler 140. The stacked staircase-shaped metal structures 142-170 may include a substantially curved shaped profile, as defined by arrow $C_p$. The curved profile of the optical coupler 140, as depicted by arrow $C_p$, mitigates or eliminates optical power loss that may be experienced as a result of sharp bends in optical waveguide structures. For example, if an optical fiber waveguide is bent beyond a particular radius of curvature, a portion of the propagating optical signal may leak from the region of the bend and, thus, attribute to bend loss. By gradually curving the optical coupler 140 between its substantially vertical orientation, as indicated by arrow $V_O$, and substantially horizontal orientation, as indicated by $H_O$, bend loss is accordingly minimized or eliminated.

The stacked staircase-shaped metal structures 142-170 may each have a thickness of about 0.25 µm to about 1.0 µm. Referring to FIG. 4A, the maximum width $W_t$ of the opening $O_p$ created within metal structures 142-170 may be about 0.25 µm to about 2.0 µm. As depicted, the profile of the opening created by the metal structures 142-170 may be substantially rectangular in shape.

However, referring to FIG. 4B, in an alternative embodiment, the metal structures 142-170 may alternatively include a substantially circular or elliptical boundary shape, as defined by $B'_e$. Similarly, the maximum width $W'_t$ of the opening $O'_p$ created within metal structures 142-170 may also be about 0.25 µm to about 2.0 µm.

Referring to FIG. 1B, a cross-sectional view of an exemplary embodiment of integrated photonics device 180 is depicted. Integrated photonics device 180 may be formed by creating patterning photoresist layer 182 over integrated photonics device 100 (FIG. 1A) and etching dielectric regions 144, 148, 152, 156, 160, 164, 168, and 172 (FIG. 1A) from within metal structures 142, 146, 150, 154, 158, 162, 166, and 170 (FIG. 1A), respectively. As illustrated, opening 184 is created within metal structures 142, 146, 150, 154, 158, 162, 166, and 170. For example, a hydrofluoric acid (HF) wet etch selective to metal and silicon may be used to etch the $SiO_2$ dielectric material of dielectric regions 144, 148, 152, 156, 160, 164, 168, and 172 (FIG. 1A). In addition, $CF_4:O_2$ plasma may be used to remove barrier layers (not shown) such as SiN or SiCN from the top of the silicon or polysilicon waveguide structure 108.

Referring to FIG. 1C, a cross-sectional view of an exemplary embodiment of integrated photonics device 185 is depicted. Integrated photonics device 185 may be formed by depositing a polycrystalline silicon fill 188 within the opening 184 (FIG. 1B) of integrated photonics device 180. The polycrystalline silicon fill 188 may be formed by depositing a polycrystalline silicon layer (not shown) both over the top surface $S_e$ of electrical interconnection region 125 and within opening 184 (FIG. 1B). Following a chemical mechanical polishing (CMP) process, the depicted polycrystalline silicon fill 188 remains within opening 184 (FIG. 1B).

The polycrystalline silicon fill 188 within the structure of integrated photonics device 185 forms the core region and, therefore, the optical signal guiding region of the optical coupler 140, while metal structures 142, 146, 150, 154, 158, 162, 166, and 170 constitute a cladding region for the optical coupler 140. Thus, the refractive index difference between the core and cladding regions provide for the internal guiding of an optical signal within the polycrystalline silicon fill 188 region. Both the polycrystalline silicon fill 188 and the metal structures 142, 146, 150, 154, 158, 162, 166, 170 may form optical coupler 140.

As illustrated, an alignment region 190 may facilitate the aligning of an optical fiber 192 with a substantially vertical portion 191 of the optical coupler 140. In particular, the core 195 of the optical fiber 192 is vertically aligned with end facet 196 (i.e., top facet) of the substantially vertical portion 191 of optical coupler 140. The core 195 of the optical fiber 192 may have a diameter of approximately 1-10 µm. The optical fiber 192 may be directly coupled to the end facet 196 of the substantially vertical portion 191 as a result of the substantially coplanar relationship between the top surface $S_e$ of the electrical interconnection region 125, the top surface $S_f$ of the fill material 188, and the end facet 196 of the optical coupler 140. Based on this direct coupling, the efficiency of the optical signal transferred from the core 195 of the optical fiber 192 to the end facet 196 of the optical coupler 140 may increase.

As further depicted in FIG. 1C, in operation, an optical signal path may exist as optical signals, as defined by arrows P, are conveyed along an embedded (e.g., within integrated photonic structure 185) optical waveguide structure that may, for example, include optical coupler 140 and silicon waveguide 108. It may be appreciated that although a circular waveguide such as optical fiber 192 is coupled to the optical coupler 140, any other optical waveguide type that may be configured to deliver optical signals to the optical coupler 140 may be contemplated. The optical coupler 140 may, therefore, couple optical signals that are received at the top surface $S_e$ of the electrical interconnection region 125 to the silicon waveguide 108. Thus, the optical signals that are received may propagate through the vertical portion 191 (e.g., provided by metal structures 166 & 170) of the optical coupler 140; a curved portion of the optical coupler 140 provided by, for example, metal structures 146, 150, 154, 158, and 162; and a horizontal portion of the optical coupler 140 provided by, for example, metal structure 142. As depicted, a coupling region 199 may include the horizontal portion of the optical coupler 140 provided by metal structure 142, which optically couples guided optical signals to the silicon waveguide 108.

FIGS. 2A-2D are cross-sectional views corresponding to the fabrication of a vertical bend optical waveguide coupler within an integrated photonic semiconductor device structure according to another exemplary embodiment. The integrated photonic semiconductor device structure depicted in FIGS. 2A-2D may be substantially similar to that described in relation to FIGS. 1A-1C. However, in contrast, FIGS. 2A-2C describe a process of forming an alternative optical coupler 240 (FIGS. 2A-2D) embodiment in comparison to the exemplary optical coupler 140 depicted in FIGS. 1A-1C.

Figure 2A:
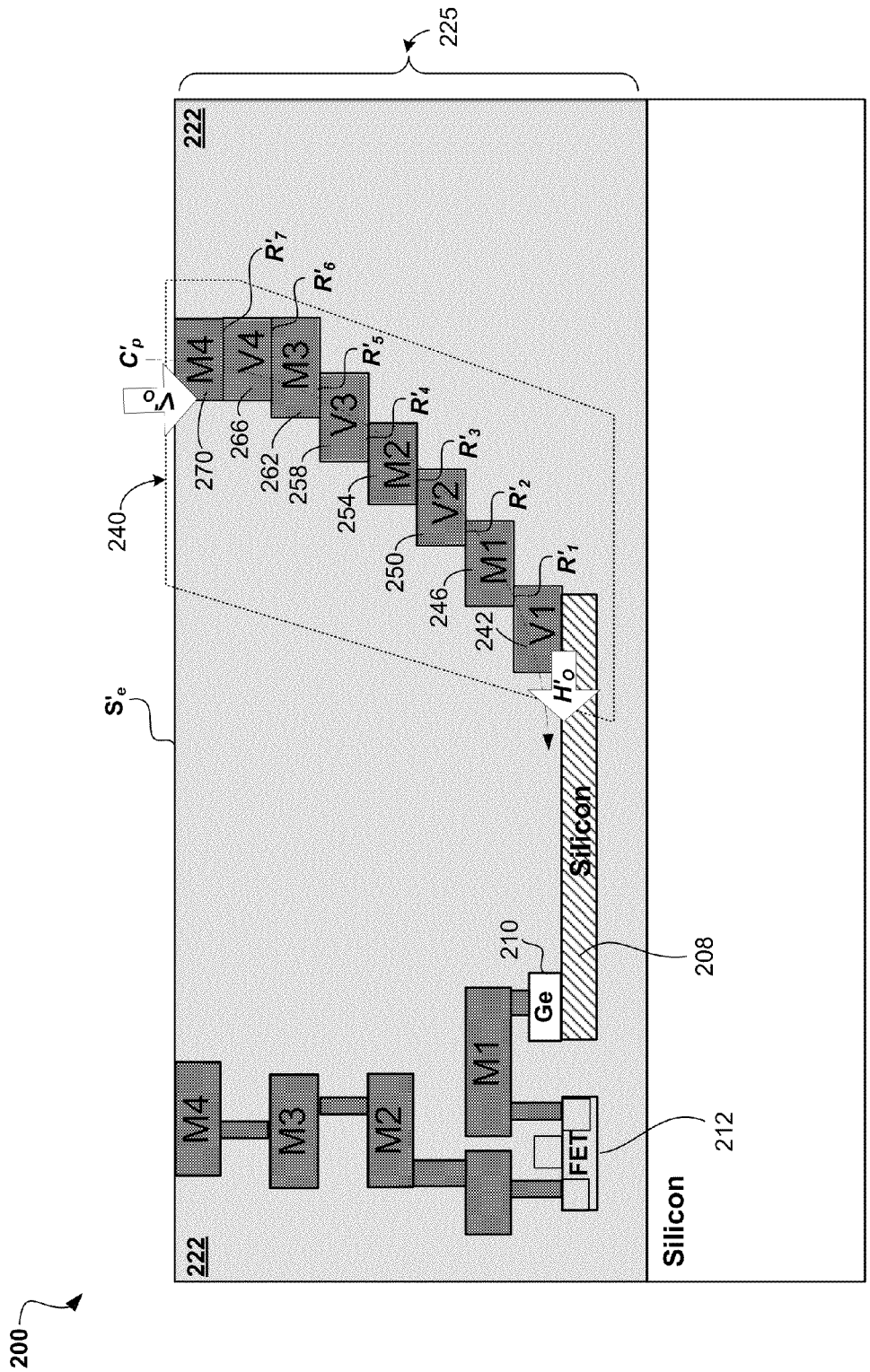
FIGS. 2A-2D are cross-sectional views corresponding to the fabrication of a vertical bend optical waveguide coupler within an integrated photonic semiconductor device structure according to another exemplary embodiment.

Referring to FIG. 2A, a cross-sectional view of an exemplary embodiment of an integrated semiconductor photonics device 200 is depicted. As previously described in relation to FIGS. 1A-1C, the exemplary embodiment of FIG. 2A may utilize the process of establishing electrical interconnectivity between fabricated semiconductor devices (e.g., FET: 212, Ge Photodetector: 210) to concurrently create an embedded optical coupler. The optical coupler accordingly guides optical signals that may be received from the top surface $S'_e$ of the electrical interconnection region 225 to an embedded optical waveguide structure such as silicon or polysilicon waveguide 208. Particularly, the metallization layers (i.e., M1-M4) and corresponding via layers (i.e., V1-V4) that are used to establish interconnectivity within the electrical interconnection region 225 may enable the creation of optical coupler 240. The following describes the formation of the optical coupler 240 using example BEOL processes for establishing electrical interconnections within the integrated semiconductor photonics device 200.

For example, via layer V1 may be utilized to fabricate metal structure 242 within one of the interlayer dielectric layers 222 of electrical interconnection region 225. Referring to the plan view depicted in FIG. 4C, metal structure 242 (FIG. 2A) includes a substantially rectangular boundary profile, as defined by $C_e$. The metal structure 242 (FIG. 2A) is solid and, therefore, does not create a boundary around any of the dielectric material of region 222 (FIG. 2A). Metal structure 242 may be formed over a portion of the top surface of silicon waveguide structure 208.

Metal layer M1 may be utilized to fabricate metal structure 246 within one of the interlayer dielectric layers 222 of electrical interconnection region 225. Referring to the plan view depicted in FIG. 4C, metal structure 246 (FIG. 2A) includes a substantially rectangular boundary profile, as defined by $C_e$. The metal structure 246 (FIG. 2A) is solid and, therefore, does not create a boundary around any of the dielectric material of region 222 (FIG. 2A). As depicted, metal structure 246 is formed over a region $R'_1$ of the top portion of underlying metal structure 242.

Via layer V2 may be utilized to fabricate metal structure 250 within one of the interlayer dielectric layers 222 of electrical interconnection region 225. Referring to the plan view depicted in FIG. 2A, metal structure 250 (FIG. 2A) also includes a substantially rectangular boundary profile, as defined by $C_e$. The metal structure 250 (FIG. 2A) is solid and, therefore, does not create a boundary around any of the dielectric material of region 222 (FIG. 2A). Metal structure 250 may be formed over a region $R'_2$ of the top portion of underlying metal structure 246.

Metal layer M2 may be utilized to fabricate metal structure 254 within one of the interlayer dielectric layers 222 of electrical interconnection region 225. Referring to the plan view depicted in FIG. 4C, metal structure 254 (FIG. 2A) includes a substantially rectangular boundary profile, as defined by $C_e$. The metal structure 254 (FIG. 2A) is solid and, therefore, does not create a boundary around any of the dielectric material of region 222 (FIG. 2A). As depicted, metal structure 254 is formed over a region $R'_3$ of the top portion of underlying metal structure 250.

Via layer V3 may be utilized to fabricate metal structure 258 within one of the interlayer dielectric layers 222 of electrical interconnection region 225. Referring to the plan view depicted in FIG. 4C, metal structure 258 (FIG. 2A) also includes a substantially rectangular boundary profile, as defined by $C_e$. The metal structure 258 (FIG. 2A) is solid and, therefore, does not create a boundary around any of the dielectric material of region 222 (FIG. 2A). Metal structure 258 may be formed over a region $R'_4$ of the top portion of underlying metal structure 254.

Metal layer M3 may be utilized to fabricate metal structure 262 within one of the interlayer dielectric layers 222 of electrical interconnection region 225. Referring to the plan view depicted in FIG. 4C, metal structure 262 (FIG. 2A) includes a substantially rectangular boundary profile, as defined by $C_e$. The metal structure 262 (FIG. 2A) is solid and, therefore, does not create a boundary around any of the dielectric material of region 222 (FIG. 2A). As depicted, metal structure 262 is formed over a region $R'_5$ of the top portion of underlying metal structure 258.

Via layer V4 may be utilized to fabricate metal structure 266 within one of the interlayer dielectric layers 222 of electrical interconnection region 225. Referring to the plan view depicted in FIG. 4C, metal structure 266 (FIG. 2A) also includes a substantially rectangular boundary profile, as defined by $C_e$. The metal structure 266 (FIG. 2A) is solid and, therefore, does not create a boundary around any of the dielectric material of region 222 (FIG. 2A). Metal structure 266 may be formed over a region $R'_6$ of the top portion of underlying metal structure 262.

Metal layer M4 may be utilized to fabricate metal structure 270 within one of the interlayer dielectric layers 222 of electrical interconnection region 225. Referring to the plan view depicted in FIG. 4C, metal structure 270 (FIG. 2A) includes a substantially rectangular boundary profile, as defined by $C_e$. The metal structure 270 (FIG. 2A) is solid and, therefore, does not create a boundary around any of the dielectric material of region 222 (FIG. 2A). As depicted, metal structure 270 is formed over a region $R'_7$ of the top portion of underlying metal structure 266.

As depicted, the foregoing describes a stacked staircase-shaped metal structure that is formed from interleaved via and metallization layers. It may be appreciated that metal structures 242-270 can be formed from any processes used for BEOL electrical interconnectivity. Moreover, it may be contemplated that other electrically conductive non-metallic materials (e.g., doped polysilicon) may be used in place of the metal structures. As described in the following paragraphs, the stacked staircase-shaped metal structures 242-270 facilitate the formation of the core of the optical coupler 240. The stacked staircase-shaped metal structures 242-270 may include a substantially curved shaped profile, as defined by arrow $C'_p$. The curved profile of the optical coupler 240, as depicted by arrow $C'_p$, mitigates or eliminates optical power loss that may be experienced as a result of sharp bends in optical waveguide structures. For example, if an optical fiber waveguide is bent beyond a particular radius of curvature, a portion of the propagating optical signal may leak from the region of the bend and, thus, attribute to bend loss. By gradually curving the optical coupler 240 between its substantially vertical orientation, as indicated by arrow $V'_O$, and substantially horizontal orientation, as indicated by $H'_O$, bend loss is accordingly minimized or eliminated.

The stacked staircase-shaped metal structures 242-270 may each have a thickness of about 0.25 μm to about 1.0 μm. Referring to FIG. 4C, the maximum width $W''_t$ of the solid cross sectional profile of metal structures 242-270 may be about 0.25 µm to about 2.0 µm. As depicted, the boundary profile of the metal structures 242-270 may be substantially rectangular in shape.

However, referring to FIG. 4C, in an alternative embodiment, the metal structures 242-270 may alternatively include a substantially circular or elliptical boundary shape, as defined by $C'_e$. Similarly, the maximum width $W'''_t$ of the solid cross sectional profile of structures 242-270 may also have a width of about 0.25 µm to about 2.0 µm.

Figure 2B:
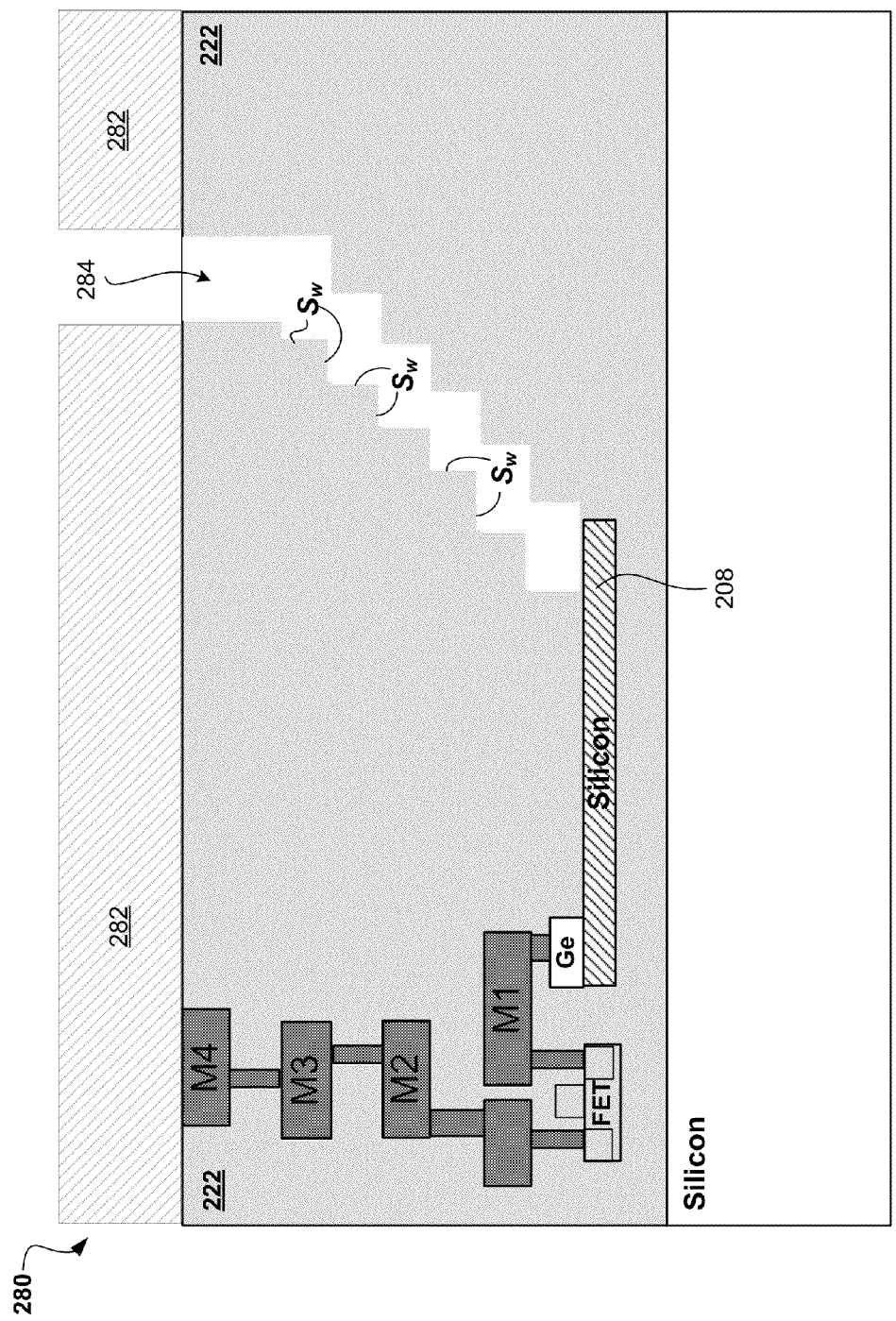

Referring to FIG. 2B, a cross-sectional view of an exemplary embodiment of integrated photonics device 280 is depicted. Integrated photonics device 280 may be formed by creating patterning photoresist layer 282 over integrated photonics device 200 (FIG. 2A) and etching metal structures 242, 246, 250, 254, 258, 262, 266, and 270 (FIG. 2A). As illustrated, opening 284 is created in the place of etched metal structures 242, 246, 250, 254, 258, 262, 266, and 270. Thus, a wet etch chemistry that is selective to oxide (i.e., oxide region 222) and polysilicon (i.e., polysilicon waveguide 208) may be used to etch away only the metal structures 242, 246, 250, 254, 258, 262, 266, 270 (FIG. 2A). For example, a wet etch including a mixture of $H_2O:H_2SO_4:H_2O_2$ that is selective to oxide and polysilicon may be used to etch metal structures 242, 246, 250, 254, 258, 262, 266, and 270 (FIG. 2A) that are made from copper (Cu). According to another example, a wet etch including a mixture of $H_2O_2:H_2O$ that is selective to oxide and polysilicon may be used to etch metal structures 242, 246, 250, 254, 258, 262, 266, and 270 (FIG. 2A) that are made from tungsten (W). Also, a wet etch including a mixture of $HCl:H_2O$ that is selective to oxide and polysilicon may be used to etch metal structures 242, 246, 250, 254, 258, 262, 266, and 270 (FIG. 2A) that are made from aluminum (Al). Finally, barrier layers such as TiN may be etched from over the top or bottom surfaces of the metal structures 242, 246, 250, 254, 258, 262, 266, 270 (FIG. 2A) using a $CF_4:O_2$ plasma.

Figure 2C:
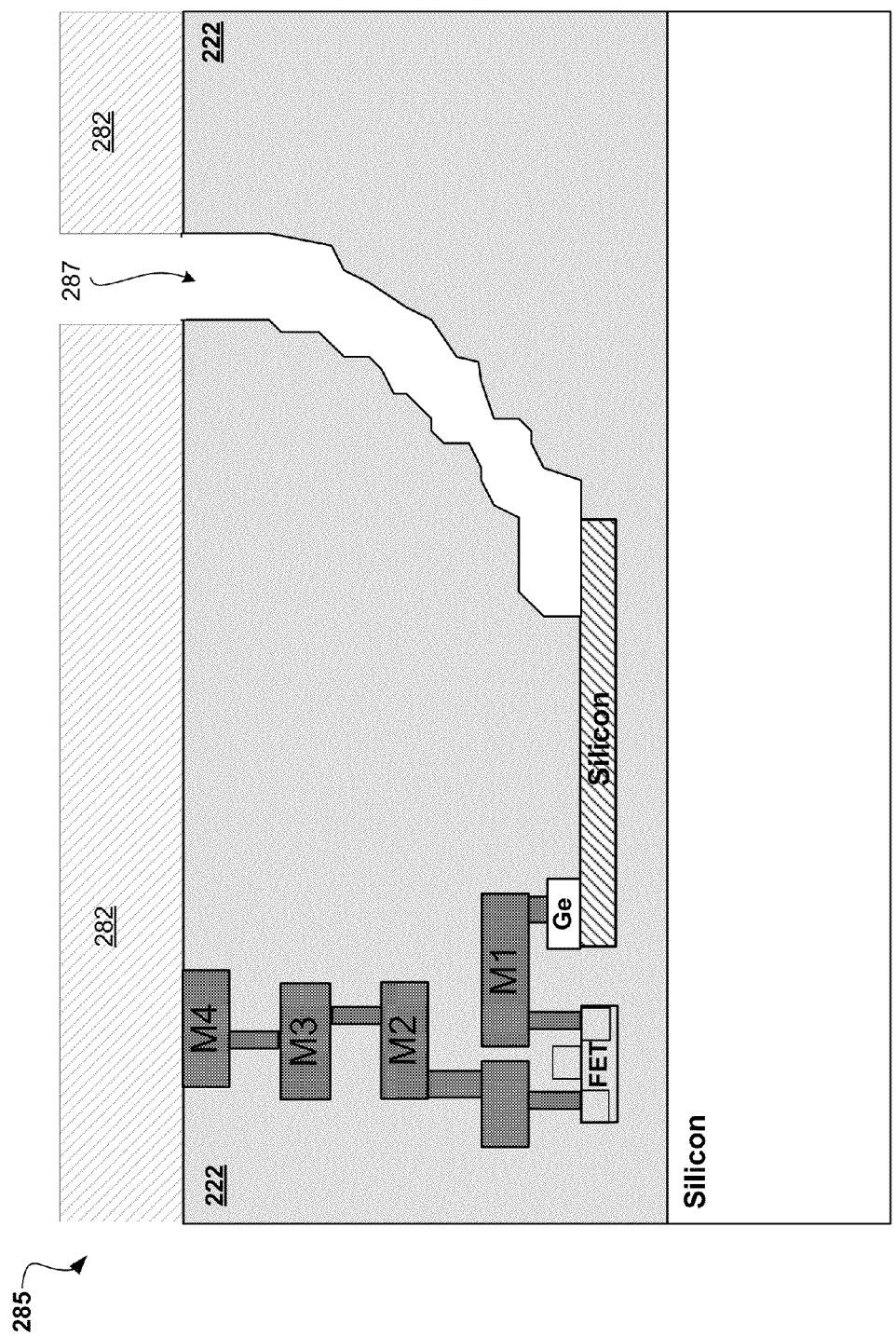

Referring to FIG. 2C, a cross-sectional view of an exemplary embodiment of integrated photonics device 285 is depicted. Integrated photonics device 285 may be formed by applying a light wet-oxide etch (e.g., diluted hydrofluoric acid) for smoothing the step-shaped sidewalls $S_w$ (FIG. 2B) within opening 284 (FIG. 2B) of Integrated photonics device 280 (FIG. 2B). Accordingly, opening 287 may be formed.

Figure 2D:
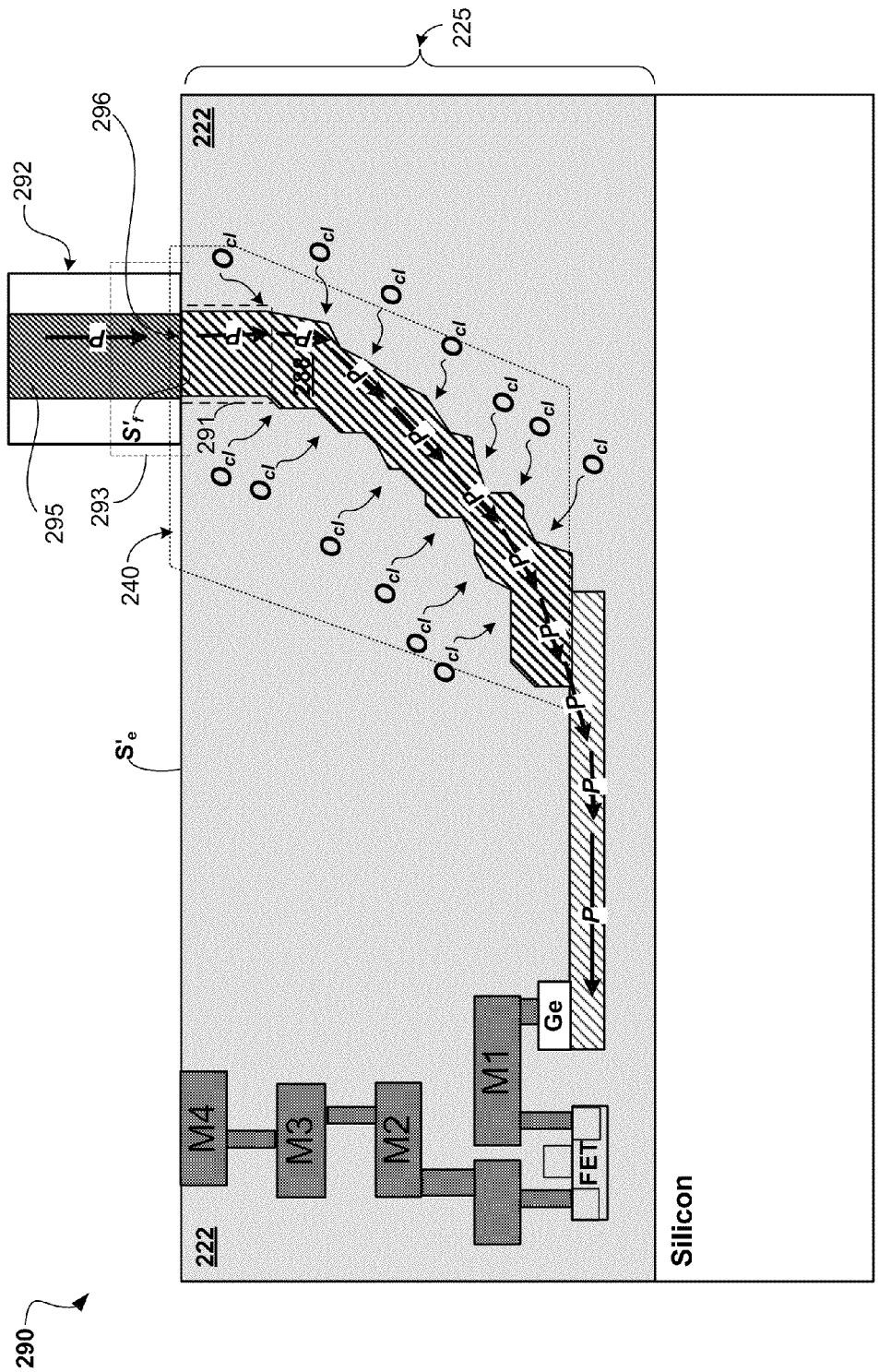

Referring to FIG. 2D, a cross-sectional view of an exemplary embodiment of integrated photonics device 290 is depicted. Integrated photonics device 290 may be formed by depositing a polycrystalline silicon fill 288 within the opening 287 (FIG. 2C) of integrated photonics device 285. The polycrystalline silicon fill 288 may be formed by depositing a polycrystalline silicon layer (not shown) both over the top surface $S'_e$ of electrical interconnection region 225 and within opening 287 (FIG. 2C). Following a chemical mechanical polishing (CMP) process, the depicted polycrystalline silicon fill 288 remains within opening 287 (FIG. 2C) of integrated photonics device 285.

The polycrystalline silicon fill 288 within opening 287 (FIG. 2C) of integrated photonics device 290 forms the core region and, therefore, the optical signal guiding region of the optical coupler 240, while the oxide region $O_{cl}$ surrounding the polycrystalline silicon fill 288 region (i.e., the core) constitutes a cladding region for the optical coupler 240. Thus, the refractive index difference between the core and cladding regions provide for the internal guiding of an optical signal within the polycrystalline silicon fill 288 region. Both the polycrystalline silicon fill 288 and the metal structures 242, 246, 250, 254, 258, 262, 266, 270 may form optical coupler 240.

As illustrated, an alignment region 293 may facilitate the aligning of an optical fiber 292 with a substantially vertical portion 291 of the optical coupler 240. In particular, the core 295 of the optical fiber 292 is vertically aligned with end facet 296 of the substantially vertical portion 291 of optical coupler 240. The core 295 of the optical fiber 192 may have a diameter of approximately 1-10 µm. The optical fiber 292 may be directly coupled to the end facet 296 of the substantially vertical portion 291 as a result of the substantially coplanar relationship between the top surface $S'_e$ of the electrical interconnection region 225, the top surface $S'_f$ of the fill material 288, and the end facet 296 of the optical coupler 240. Based on this direct coupling, the efficiency of the optical signal transferred from the core 295 of the optical fiber 292 to the end facet 296 of the optical coupler 240 may increase.

As further depicted in FIG. 2D, in operation, an optical signal path may exist as optical signals, as defined by arrows P, are conveyed along an embedded (e.g., within integrated photonic structure 290) optical waveguide structure that may, for example, include optical coupler 240 and silicon waveguide 208. It may be appreciated that although a circular waveguide such as optical fiber 292 is coupled to the optical coupler 240, any other optical waveguide type that may be configured to deliver optical signals to the optical coupler 240 may be contemplated. Moreover, the depicted curved profile of the optical coupler 240 mitigates or eliminates optical power loss that may be experienced as a result of sharp bends in optical waveguide structures. For example, if an optical fiber waveguide is bent beyond a particular radius of curvature, a portion of the propagating optical signal may leak from the region of the bend and, thus, attribute to bend loss. By gradually curving the optical coupler 240 between its substantially vertical and substantially horizontal orientations, bend loss is accordingly minimized or eliminated.

Figure 3A:
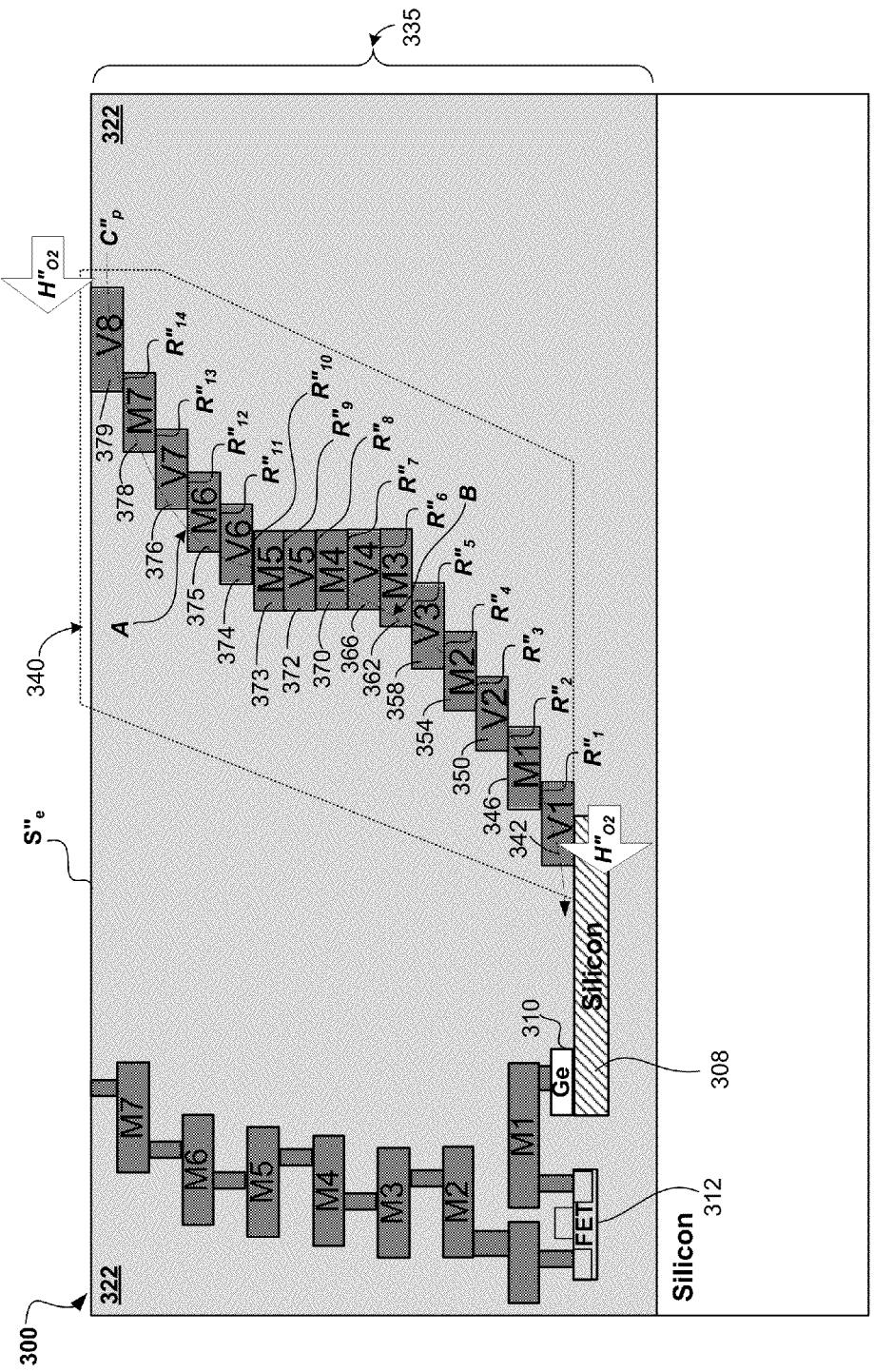
FIGS. 3A-3C are cross-sectional views corresponding to the fabrication of a vertical bend optical waveguide coupler within an integrated photonic semiconductor device structure according to yet another exemplary embodiment.
Figure 3B:
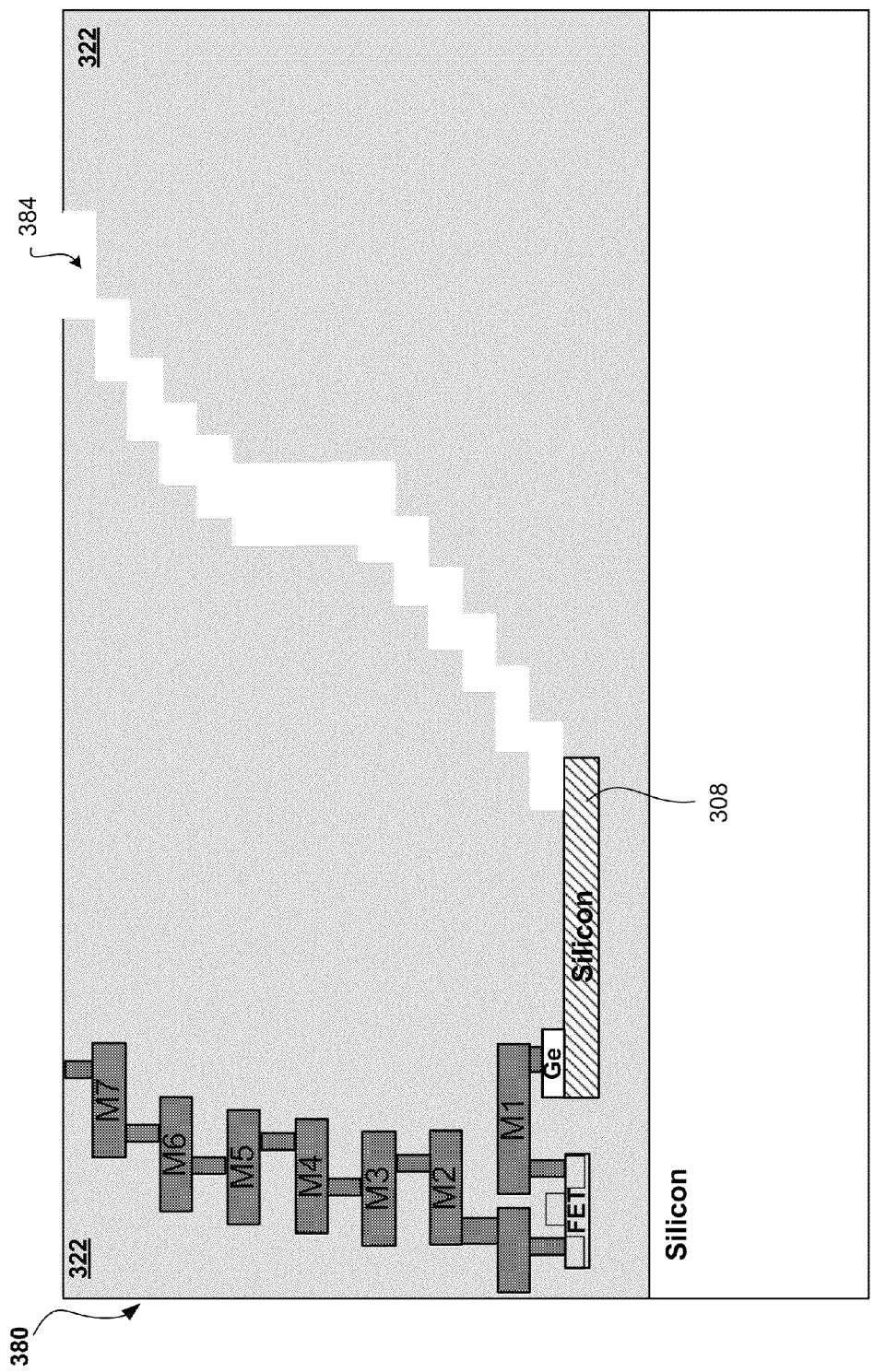
Figure 3C:
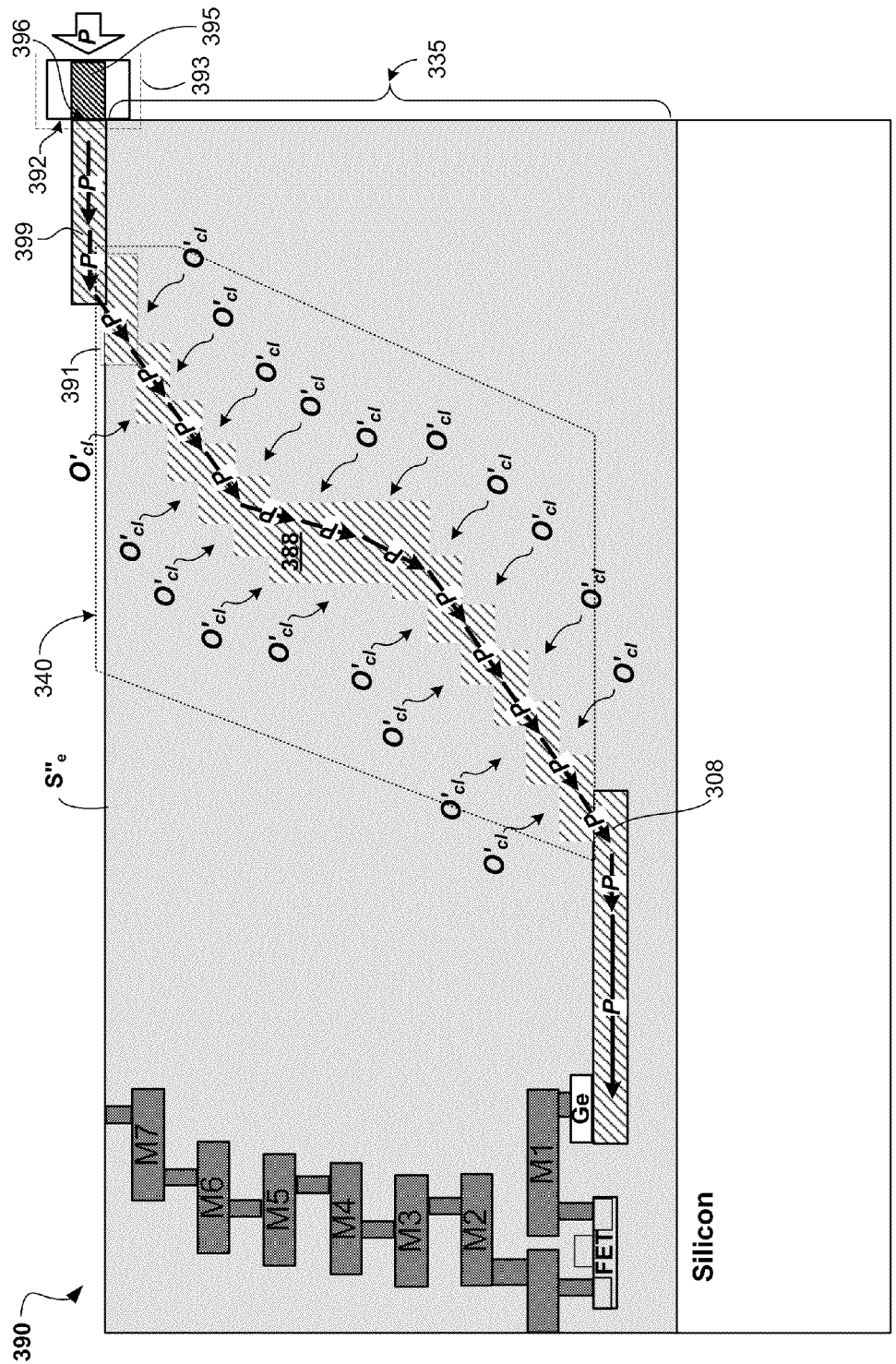

FIGS. 3A-3C are cross-sectional views corresponding to the fabrication of a vertical bend optical waveguide coupler within an integrated photonic semiconductor device structure according to yet another exemplary embodiment. The integrated photonic semiconductor device structure depicted in FIGS. 3A-3C may be substantially similar to that described in relation to both FIGS. 1A-1C and FIGS. 2A-2D. Further, as described in the following paragraphs, the integrated photonic semiconductor device structure depicted in FIGS. 3A-3C is formed according to substantially identical processes to that of the integrated photonic semiconductor device structure depicted in FIGS. 2A-2D. However, in contrast, FIGS. 3A-3C describe a process of forming an alternative optical coupler 340 (FIGS. 3A-3C) embodiment in comparison to exemplary optical coupler 140 (FIGS. 1A-1C) and optical exemplary coupler 240 (FIGS. 2A-2D). Specifically, while optical coupler 140 (FIGS. 1A-1C) and optical coupler 240 (FIGS. 2A-2D) have a substantially curve-shape, optical coupler 340 (FIGS. 3A-3C) is fabricated to include a substantially S-shaped profile.

The substantially S-shaped profile may include any shape that includes an upper horizontal portion and a lower horizontal portion, whereby the upper horizontal portion and the lower horizontal portion are connected by an intermediary curved portion.

Referring to FIG. 3A, a cross-sectional view of an exemplary embodiment of an integrated semiconductor photonics device 300 is depicted. As previously described in relation to FIGS. 2A-2D, the exemplary embodiment of FIG. 3A may utilize the process of establishing electrical interconnectivity between fabricated semiconductor devices (e.g., FET: 312, Ge Photodetector: 310) to concurrently create an embedded optical coupler. The optical coupler accordingly guides optical signals that may be received from the top surface S", of the electrical interconnection region 325 to an embedded optical waveguide structure such as silicon or polysilicon waveguide 308. Particularly, the metallization layers (i.e., M1-M7) and corresponding via layers (i.e., V1-V8) that are used to establish interconnectivity within the electrical interconnection region 325 may enable the creation of optical coupler 340. The following describes the formation of the optical coupler 340 using example BEOL processes for establishing electrical interconnections within the integrated semiconductor photonics device 300.

For example, via layer V1 may be utilized to fabricate metal structure 342 within one of the interlayer dielectric layers 322 of electrical interconnection region 325. Referring to the plan view depicted in FIG. 4C, metal structure 342 (FIG. 3A) includes a substantially rectangular boundary profile, as defined by $C_e$. The metal structure 342 (FIG. 2A) is solid and, therefore, does not create a boundary around any of the dielectric material of region 322 (FIG. 3A). Metal structure 342 may be formed over a portion of the top surface of silicon waveguide structure 308.

Metal layer M1 may be utilized to fabricate metal structure 346 within one of the interlayer dielectric layers 322 of electrical interconnection region 325. Referring to the plan view depicted in FIG. 4C, metal structure 346 (FIG. 3A) includes a substantially rectangular boundary profile, as defined by $C_e$. The metal structure 346 (FIG. 3A) is solid and, therefore, does not create a boundary around any of the dielectric material of region 322 (FIG. 3A). As depicted, metal structure 346 is formed over a region $R''_1$ of the top portion of underlying metal structure 342.

Via layer V2 may be utilized to fabricate metal structure 350 within one of the interlayer dielectric layers 322 of electrical interconnection region 325. Referring to the plan view depicted in FIG. 4C, metal structure 350 (FIG. 3A) also includes a substantially rectangular boundary profile, as defined by $C_e$. The metal structure 350 (FIG. 3A) is solid and, therefore, does not create a boundary around any of the dielectric material of region 322 (FIG. 3A). Metal structure 350 may be formed over a region $R''_2$ of the top portion of underlying metal structure 346.

Metal layer M2 may be utilized to fabricate metal structure 354 within one of the interlayer dielectric layers 322 of electrical interconnection region 325. Referring to the plan view depicted in FIG. 4C, metal structure 354 (FIG. 3A) includes a substantially rectangular boundary profile, as defined by $C_e$. The metal structure 354 (FIG. 3A) is solid and, therefore, does not create a boundary around any of the dielectric material of region 322 (FIG. 3A). As depicted, metal structure 354 is formed over a region $R''_3$ of the top portion of underlying metal structure 350.

Via layer V3 may be utilized to fabricate metal structure 358 within one of the interlayer dielectric layers 322 of electrical interconnection region 325. Referring to the plan view depicted in FIG. 4C, metal structure 358 (FIG. 3A) also includes a substantially rectangular boundary profile, as defined by $C_e$. The metal structure 358 (FIG. 3A) is solid and, therefore, does not create a boundary around any of the dielectric material of region 322 (FIG. 3A). Metal structure 358 may be formed over a region $R''_4$ of the top portion of underlying metal structure 354.

Metal layer M3 may be utilized to fabricate metal structure 362 within one of the interlayer dielectric layers 322 of electrical interconnection region 325. Referring to the plan view depicted in FIG. 4C, metal structure 362 (FIG. 3A) includes a substantially rectangular boundary profile, as defined by $C_e$. The metal structure 362 (FIG. 3A) is solid and, therefore, does not create a boundary around any of the dielectric material of region 322 (FIG. 2A). As depicted, metal structure 362 is formed over a region $R''_5$ of the top portion of underlying metal structure 358.

Via layer V4 may be utilized to fabricate metal structure 366 within one of the interlayer dielectric layers 322 of electrical interconnection region 325. Referring to the plan view depicted in FIG. 4C, metal structure 366 (FIG. 3A) also includes a substantially rectangular boundary profile, as defined by $C_e$. The metal structure 366 (FIG. 3A) is solid and, therefore, does not create a boundary around any of the dielectric material of region 322 (FIG. 3A). Metal structure 366 may be formed over a region $R''_6$ of the top portion of underlying metal structure 362.

Metal layer M4 may be utilized to fabricate metal structure 370 within one of the interlayer dielectric layers 322 of electrical interconnection region 325. Referring to the plan view depicted in FIG. 4C, metal structure 370 (FIG. 3A) includes a substantially rectangular boundary profile, as defined by $C_e$. The metal structure 370 (FIG. 3A) is solid and, therefore, does not create a boundary around any of the dielectric material of region 322 (FIG. 3A). As depicted, metal structure 370 is formed over a region $R''_7$ of the top portion of underlying metal structure 366.

Via layer V5 may be utilized to fabricate metal structure 372 within one of the interlayer dielectric layers 322 of electrical interconnection region 325. Referring to the plan view depicted in FIG. 4C, metal structure 372 (FIG. 3A) also includes a substantially rectangular boundary profile, as defined by $C_e$. The metal structure 372 (FIG. 3A) is solid and, therefore, does not create a boundary around any of the dielectric material of region 322 (FIG. 3A). Metal structure 372 may be formed over a region $R''_8$ of the top portion of underlying metal structure 370.

Metal layer M5 may be utilized to fabricate metal structure 373 within one of the interlayer dielectric layers 322 of electrical interconnection region 325. Referring to the plan view depicted in FIG. 4C, metal structure 373 (FIG. 3A) includes a substantially rectangular boundary profile, as defined by $C_e$. The metal structure 373 (FIG. 3A) is solid and, therefore, does not create a boundary around any of the dielectric material of region 322 (FIG. 3A). As depicted, metal structure 373 is formed over a region $R''_9$ of the top portion of underlying metal structure 372.

Via layer V6 may be utilized to fabricate metal structure 374 within one of the interlayer dielectric layers 322 of electrical interconnection region 325. Referring to the plan view depicted in FIG. 4C, metal structure 374 (FIG. 3A) also includes a substantially rectangular boundary profile, as defined by $C_e$. The metal structure 374 (FIG. 3A) is solid and, therefore, does not create a boundary around any of the dielectric material of region 322 (FIG. 3A). Metal structure 374 may be formed over a region $R''_{10}$ of the top portion of underlying metal structure 373.

Metal layer M6 may be utilized to fabricate metal structure 375 within one of the interlayer dielectric layers 322 of electrical interconnection region 325. Referring to the plan view depicted in FIG. 4C, metal structure 375 (FIG. 3A) includes a substantially rectangular boundary profile, as defined by $C_e$. The metal structure 375 (FIG. 3A) is solid and, therefore, does not create a boundary around any of the dielectric material of region 322 (FIG. 2A). As depicted, metal structure 375 is formed over a region $R''_{11}$ of the top portion of underlying metal structure 374.

Via layer V7 may be utilized to fabricate metal structure 376 within one of the interlayer dielectric layers 322 of electrical interconnection region 325. Referring to the plan view depicted in FIG. 4C, metal structure 376 (FIG. 3A) also includes a substantially rectangular boundary profile, as defined by $C_e$. The metal structure 376 (FIG. 3A) is solid and, therefore, does not create a boundary around any of the dielectric material of region 322 (FIG. 3A). Metal structure 376 may be formed over a region $R''_{12}$ of the top portion of underlying metal structure 375.

Metal layer M7 may be utilized to fabricate metal structure 378 within one of the interlayer dielectric layers 322 of electrical interconnection region 325. Referring to the plan view depicted in FIG. 4C, metal structure 378 (FIG. 3A) includes a substantially rectangular boundary profile, as defined by $C_e$. The metal structure 378 (FIG. 3A) is solid and, therefore, does not create a boundary around any of the dielectric material of region 322 (FIG. 3A). As depicted, metal structure 378 is formed over a region $R''_{13}$ of the top portion of underlying metal structure 376.

Via layer V8 may be utilized to fabricate metal structure 379 within one of the interlayer dielectric layers 322 of electrical interconnection region 325. Referring to the plan view depicted in FIG. 4C, metal structure 379 (FIG. 3A) also includes a substantially rectangular boundary profile, as defined by $C_e$. The metal structure 379 (FIG. 3A) is solid and, therefore, does not create a boundary around any of the dielectric material of region 322 (FIG. 3A). Metal structure 379 may be formed over a region $R''_{14}$ of the top portion of underlying metal structure 378.

As depicted, the foregoing describes a stacked staircase-shaped metal structure that is formed from interleaved via and metallization layers. It may be appreciated that metal structures 342-379 can be formed from any processes used for BEOL electrical interconnectivity. Moreover, it may be contemplated that other electrically conductive non-metallic materials (e.g., doped polysilicon) may be used in place of the metal structures. As described in the following paragraphs, the stacked staircase-shaped metal structures 342-379 facilitate the formation of the core of the optical coupler 340. The stacked staircase-shaped metal structures 342-379 may include a substantially S-shaped profile, as defined by arrow $C''_p$. The approximate S-shaped profile of the optical coupler 340, as depicted by arrow $C''_p$, mitigates or eliminates optical power loss that may be experienced as a result of sharp bends in optical waveguide structures. For example, if an optical fiber waveguide is bent beyond a particular radius of curvature, a portion of the propagating optical signal may leak from the region of the bend and, thus, attribute to bend loss. By gradually curving the optical coupler 340 (i.e., at regions A & B) between its substantially horizontal input orientation, as indicated by arrow $H''_{O1}$, and substantially horizontal output orientation, as indicated by $H''_{O2}$, bend loss is accordingly minimized or eliminated.

The stacked staircase-shaped metal structures 342-379 may each have a thickness of about 0.25 μm to about 1.0 μm. Referring to FIG. 4C, the maximum width $W''_t$ of the solid cross sectional profile of metal structures 342-379 may be about 0.25 μm to about 2.0 μm. As depicted, the boundary profile of the metal structures 342-379 may be substantially rectangular in shape.

However, referring to FIG. 4C, in an alternative embodiment, the metal structures 342-379 may alternatively include a substantially circular or elliptical boundary shape, as defined by $C'_e$. Similarly, the maximum width $W'''_t$ of the solid cross sectional profile of structures 342-379 may also have a width of about 0.25 μm to about 2.0 μm.

Referring to FIG. 3B, a cross-sectional view of an exemplary embodiment of integrated photonics device 380 is depicted. Integrated photonics device 380 may be formed by creating a patterning photoresist layer (not shown) over integrated photonics device 300 (FIG. 3A) and etching metal structures 342, 346, 350, 354, 358, 362, 366, 370, 372, 373, 374, 375, 376, 378, and 379 (FIG. 3A). As illustrated, opening 384 is created in the place of etched metal structures 342, 346, 350, 354, 358, 362, 366, 370, 372, 373, 374, 375, 376, 378, and 379. Thus, a wet etch chemistry that is selective to oxide (i.e., oxide region 322) and polysilicon (i.e., polysilicon waveguide 308) may be used to etch away only the metal structures 342, 346, 350, 354, 358, 362, 366, 370, 372, 373, 374, 375, 376, 378, 379 (FIG. 3A). For example, a wet etch including a mixture of $H_2O:H_2SO_4:H_2O_2$ that is selective to oxide and polysilicon may be used to etch the metal structures 342, 346, 350, 354, 358, 362, 366, 370, 372, 373, 374, 375, 376, 378, 379 (FIG. 3A) that are made from copper (Cu). According to another example, a wet etch including a mixture of $H_2O_2:H_2O$ that is selective to oxide and polysilicon may be used to etch the metal structures 342, 346, 350, 354, 358, 362, 366, 370, 372, 373, 374, 375, 376, 378, 379 (FIG. 3A) that are made from tungsten (W). Also, a wet etch including a mixture of $HCl:H_2O$ that is selective to oxide and polysilicon may be used to etch the metal structures 342, 346, 350, 354, 358, 362, 366, 370, 372, 373, 374, 375, 376, 378, 379 (FIG. 3A) that are made from aluminum (Al).

Referring to FIG. 3C, a cross-sectional view of an exemplary embodiment of integrated photonics device 390 is depicted. Integrated photonics device 390 may be formed by depositing a polycrystalline silicon fill 388 within the opening 384 (FIG. 3B) of integrated photonics device 380. The polycrystalline silicon fill 388 may be formed by depositing a polycrystalline silicon layer (not shown) both over the top surface $S''_e$ of electrical interconnection region 325 and within opening 384 (FIG. 3B). Following a chemical mechanical polishing (CMP) process, the depicted polycrystalline silicon fill 388 remains within opening 384 (FIG. 3B).

The polycrystalline silicon fill 388 within opening 384 (FIG. 3B) forms the core region and, therefore, the optical signal guiding region of the optical coupler 340, while the oxide region $O'_{cl}$ surrounding the polycrystalline silicon fill 388 region (i.e., the core) constitutes a cladding region for the optical coupler 340. Thus, the refractive index difference between the core and cladding regions provide for the internal guiding of an optical signal within the polycrystalline silicon fill 388 region. Both the polycrystalline silicon fill 388 and the metal structures 342, 346, 350, 354, 358, 362, 366, 370, 372, 373, 374, 375, 376, 378, 379 may form optical coupler 340.

As illustrated, an alignment region 393 may facilitate the aligning of an optical fiber 392 with horizontal silicon waveguide structure 399. In particular, the core 395 of the optical fiber 392 is horizontally aligned with end facet 396 of the horizontal silicon waveguide structure 399. The core 395 of the optical fiber 392 may have a diameter of approximately 1-10 μm. As depicted, the optical fiber 392 may be directly coupled to the end facet 396 of the horizontal silicon waveguide structure 399. The horizontal silicon waveguide structure 399 is also coupled to the horizontal portion 391 of the optical coupler 340. Based on this coupling arrangement, optical signals are transferred from the core 395 of the optical fiber 392 to the end facet 396 of the horizontal silicon waveguide structure 399. The optical signals then propagate through the horizontal silicon waveguide structure 399 to the horizontal portion 391 of the optical coupler 340, whereby the optical signals traverse along the optical coupler 340 to silicon waveguide 308.

As further depicted in FIG. 3C, in operation, an optical signal path may exist as optical signals, as defined by arrows P, are conveyed along an embedded (e.g., within integrated photonic structure 390) optical waveguide structure that may, for example, include optical coupler 340, silicon waveguide 308, and silicon waveguide 399. It may be appreciated that although a circular waveguide such as optical fiber 392 is coupled to the optical coupler 340 via silicon waveguide 399, any other optical waveguide type that may be configured to deliver optical signals to the optical coupler 340 may be contemplated.

FIG. 5 shows a block diagram of an exemplary design flow 900 used for example, in semiconductor IC logic design, simulation, test, layout, and manufacture. Design flow 900 includes processes and mechanisms for processing design structures or devices to generate logically or otherwise functionally equivalent representations of the design structures and/or devices described above and shown in FIGS. 1C, 2D, and 3C. The design structure processed and/or generated by design flow 900 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems.

Design flow 900 may vary depending on the type of representation being designed. For example, a design flow 900 for building an application specific IC (ASIC) may differ from a design flow 900 for designing a standard component or from a design flow 900 for instantiating the design into a programmable array, for example a programmable gate array (PGA) or a field programmable gate array (FPGA) offered by Altera® Inc. or Xilinx® Inc.

FIG. 5 illustrates multiple such design structures including an input design structure 920 that is preferably processed by a design process 910. In one embodiment, the design structure 920 comprises design data used in a design process and comprising information describing the embodiments of the invention with respect to the structures as shown in FIGS. 1C, 2D, and 3C. The design data in the form of schematics or HDL, a hardware-description language (e.g., Verilog, VHDL, C, etc.) may be embodied on one or more machine readable media. For example, design structure 920 may be a text file, numerical data or a graphical representation of the embodiments of the invention shown in FIGS. 1C, 2D, and 3C. Design structure 920 may be a logical simulation design structure generated and processed by design process 910 to produce a logically equivalent functional representation of a hardware device. Design structure 920 may also or alternatively comprise data and/or program instructions that when processed by design process 910, generate a functional representation of the physical structure of a hardware device. Whether representing functional and/or structural design features, design structure 920 may be generated using electronic computer-aided design (ECAD) such as implemented by a core developer/designer. When encoded on a machine-readable data transmission, gate array, or storage medium, design structure 920 may be accessed and processed by one or more hardware and/or software modules within design process 910 to simulate or otherwise functionally represent an electronic component, circuit, electronic or logic module, apparatus, device, or system such as that shown in FIGS. 1C, 2D, and 3C. As such, design structure 920 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 910 preferably employs and incorporates hardware and/or software modules for synthesizing, translating, or otherwise processing a design/simulation functional equivalent of the components, circuits, devices, or logic structure shown in FIGS. 1C, 2D, and 3C to generate a netlist 980 which may contain a design structure such as design structure 920. Netlist 980 may comprise, for example, compiled or otherwise processed data structures representing a list of wires, discrete components, logic gates, control circuits, I/O devices, models, etc. that describes the connections to other elements and circuits in an integrated circuit design. Netlist 980 may be synthesized using an iterative process in which netlist 980 is resynthesized one or more times depending on design specifications and parameters for the device. As with other design structure types described herein, netlist 980 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 910 may include hardware and software modules for processing a variety of input data structure types including netlist 980. Such data structure types may reside, for example, within library elements 930 and include a set of commonly used elements, circuits, and devices, including models, layouts, and symbolic representations, for a given manufacturing technology (e.g., different technology nodes, 20, 32 nm, 45 nm, 90 nm, etc.). The data structure types may further include design specifications 940, characterization data 950, verification data 960, design rules 970, and test data files 985 which may include input test patterns, output test results, and other testing information. Design process 910 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 910 without deviating from the scope and spirit of the invention. Design process 910 may also include modules for performing standard circuit design processes such as timing analysis, verification, design rule checking, place and route operations, etc.

Design process 910 employs and incorporates logic and physical design tools such as HDL compilers and simulation model build tools to process design structure 920 together with some or all of the depicted supporting data structures along with any additional mechanical design or data (if applicable), to generate a second design structure 990 comprising second design data embodied on a storage medium in a data format used for the exchange of layout data of integrated circuits and/or symbolic data format (e.g. information stored in a GDSII (GDS2), GL1, OASIS, map files, or any other suitable format for storing such design structures). In one embodiment, the second design data resides on a storage medium or programmable gate array in a data format used for the exchange of data of mechanical devices and structures (e.g. information stored in a IGES, DXF, Parasolid XT, JT, DRG, or any other suitable format for storing or rendering such mechanical design structures). Similar to design structure 920, design structure 990 preferably comprises one or more files, data structures, or other computer-encoded data or instructions that reside on transmission or data storage media and that when processed by an ECAD system generate a logically or otherwise functionally equivalent form of the embodiments of the invention shown in FIGS. 1C, 2D, and 3C. In one embodiment, design structure 990 may comprise a compiled, executable HDL simulation model that functionally simulates the devices shown in FIGS. 1C, 2D, and 3C.

Design structure 990 may also employ a data format used for the exchange of layout data of integrated circuits and/or symbolic data format (e.g. information stored in a GDSII (GDS2), GL1, OASIS, map files, or any other suitable format for storing such design data structures).

Design structure 990 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce devices or structures as described above and shown in FIGS. 1C, 2D, and 3C. Design structure 990 may then proceed to a stage 995 where, for example, design structure 990: proceeds to tape-out, is released to manufacturing, is released to a mask house, is sent to another design house, is sent back to the customer, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the one or more embodiment, the practical application or technical improvement over technologies found in the marketplace, or to enable others of ordinary skill in the art to understand the embodiments disclosed herein.

What is claimed is:

1. A waveguide structure comprising:
    an optical waveguide structure located within a semiconductor structure; and
    an optical coupler including:
        a metallic structure located within an electrical interconnection region of the semiconductor structure, the metallic structure extending downward in a substantially curved shape from a top surface of the electrical interconnection region and coupling to the optical waveguide structure, the metallic structure including a portion of a plurality of metallization layers and a portion of a plurality of via layers, the portion of the plurality of metallization layers interleaved with the portion of the plurality of via layers in a substantially vertically stacked configuration, and
        an optical signal guiding region bounded within the metallic structure,
    wherein the optical coupler receives an optical signal from the top surface and couples the optical signal to the optical waveguide structure such that the optical signal propagation is substantially vertical at the top surface and substantially horizontal at the optical waveguide structure.

2. The structure of claim 1, wherein the optical coupler comprises a core region for guiding the optical signal.

3. The structure of claim 2, wherein metallic structure comprises a cladding region for the core region.

4. A waveguide structure comprising:
    an optical waveguide structure located within a semiconductor structure; and
    an optical coupler including:
        a metallic structure located within an electrical interconnection region of the semiconductor structure, the metallic structure extending downward in a substantially curved shape from a top surface of the electrical interconnection region and coupling to the optical waveguide structure, and
        an optical signal guiding region bounded within the metallic structure,
    wherein the optical coupler receives an optical signal from the top surface and couples the optical signal to the optical waveguide structure such that the optical signal propagation is substantially vertical at the top surface and substantially horizontal at the optical waveguide structure, wherein the metallic structure comprises:
    at least one metal structure having a top metal layer located adjacent the top surface; and
    at least one via structure having a bottom via layer coupled to the waveguide structure,
    wherein each of the at least one metal structure is interleaved with each of the at least one via structure to form a staircase shape extending between the top surface of the electrical interconnection region and the optical waveguide structure.

5. The structure of claim 4, wherein the at least one metal structure and the at least one via structure each comprises a thickness of about 0.25µm to about 1.0µm.

6. The structure of claim 1, wherein the electrical interconnection region further comprises an inter layer dielectric (ILD) material.

7. The structure of claim 6, wherein the inter layer dielectric (ILD) material comprises silicon dioxide ($SiO_2$).

8. The structure of claim 1, wherein the optical coupler comprises a polycrystalline silicon material.

9. The structure of claim 1, wherein the optical waveguide structure comprises a silicon waveguide.

10. The structure of claim 1, further comprising:
    an optical fiber having a core for guiding an optical signal,
    wherein the optical fiber is vertically coupled to the top surface of the electrical interconnection region such that the core is aligned with a top facet of the optical coupler, the top facet being coplanar with the top surface.

11. The structure of claim 1, wherein the optical coupler comprises a width of about 0.25µm to about 2µm.

* * * * *